(12) United States Patent
Jang et al.

(10) Patent No.: US 9,532,303 B2
(45) Date of Patent: Dec. 27, 2016

(54) INCREASING TIME INTERVAL BETWEEN SUCCESSIVE SEARCHES FOR SIGNALING OF NEIGHBORING CELLS OF A DIFFERENT WIRELESS TECHNOLOGY

(75) Inventors: Ke-Chi Jang, Plano, TX (US); Eric Parsons, Stittsville (CA)

(73) Assignee: Apple Inc., Cupertino, CA (US)

( * ) Notice: Subject to any disclaimer, the term of this patent is extended or adjusted under 35 U.S.C. 154(b) by 763 days.

(21) Appl. No.: 13/321,282

(22) PCT Filed: Jun. 2, 2010

(86) PCT No.: PCT/US2010/037048
§ 371 (c)(1),
(2), (4) Date: Nov. 18, 2011

(87) PCT Pub. No.: WO2010/141568
PCT Pub. Date: Dec. 9, 2010

(65) Prior Publication Data
US 2012/0058760 A1   Mar. 8, 2012

Related U.S. Application Data

(60) Provisional application No. 61/183,757, filed on Jun. 3, 2009.

(51) Int. Cl.
*H04W 4/00* (2009.01)
*H04W 48/16* (2009.01)
*H04W 52/02* (2009.01)

(52) U.S. Cl.
CPC ......... *H04W 48/16* (2013.01); *H04W 52/0212* (2013.01)

(58) Field of Classification Search
CPC .... H04W 88/16; H04W 48/18; H04W 52/325; H04W 24/00; H04W 84/045; H04W 56/001; H04W 16/20; H04W 48/20;H04W 36/14; H04W 48/10; H04W 52/24; H04W 52/40; H04W 74/02; H04W 84/12; H04W 88/06; H04W 36/0088; H04W 36/0066; H04W 36/0083; H04W 88/10; H04L 63/101; H04L 45/00; H04L 41/5003; H04L 5/0007; H04L 65/1006; H04L 65/103; H04L 65/104; H04L 63/10; H04L 63/18; H04M 15/851; H04M 2215/815; H04M 15/85; H04B 17/005; H04B 17/0077; H04B 7/15507; H04B 7/2606; H04B 7/2668
(Continued)

(56) References Cited

U.S. PATENT DOCUMENTS 5,794,146 A   8/1998 Sevcik et al.
5,920,818 A   7/1999 Frodigh et al.
(Continued)

FOREIGN PATENT DOCUMENTS

CN   101213857   7/2008
JP   H10-84572   3/1998
(Continued)

OTHER PUBLICATIONS

International Search Report and Written Opinion dated Dec. 23, 2010 for International Application No. PCT/US2010/037048, International Filing Date: Jun. 2, 2010 consisting of 9 pages.
(Continued)

*Primary Examiner* — Nimesh Patel
(74) *Attorney, Agent, or Firm* — Meyertons, Hood, Kivlin, Kowert & Goetzel, P.C.

(57) ABSTRACT

A mobile station attached to an access network receives a control message identifying neighboring cells of a different wireless technology than the access network. The mobile station searches for signaling of the neighboring cells of the
(Continued)

different wireless technology, and in response to not being able to detect the signaling of the neighboring cells, the mobile station increases a time interval between successive searches for the signaling.

21 Claims, 3 Drawing Sheets

(58) Field of Classification Search
USPC ............................. 455/426.1, 435.3, 575.4
See application file for complete search history.

(56) References Cited

U.S. PATENT DOCUMENTS

| | | | |
|---|---|---|---|
| 7,251,490 | B2 | 7/2007 | Rimoni |
| 7,336,951 | B2 | 2/2008 | Choi et al. |
| 8,428,637 | B2 | 4/2013 | Narang et al. |
| 2004/0180660 | A1 | 9/2004 | Choi et al. |
| 2005/0090259 | A1 | 4/2005 | Jain et al. |
| 2008/0233955 | A1 | 9/2008 | Narang et al. |
| 2009/0137247 | A1* | 5/2009 | Mok .............................. 455/434 |
| 2009/0209278 | A1* | 8/2009 | Narang et al. ................ 455/522 |
| 2010/0124924 | A1* | 5/2010 | Cheng et al. ................. 455/434 |

FOREIGN PATENT DOCUMENTS

| | | |
|---|---|---|
| JP | 2005184824 | 7/2005 |
| JP | 2006217178 | 8/2006 |
| JP | 2007325237 | 12/2007 |
| JP | 2010531078 | 9/2010 |
| JP | 2010539838 | 12/2010 |
| WO | 2007005224 A1 | 1/2007 |
| WO | 2008108252 | 9/2008 |
| WO | 2008135851 A1 | 11/2008 |

OTHER PUBLICATIONS

Tsai et al., "Cell Search in 3GPP Long Term evolution Systems", IEEE Vehicular Technology Magazine, Jun. 2007 (pp. 23-29).
Office Action from Japanese Application No. 2012-514075, Mar. 30, 2014, English and Japanese versions, pp. 1-12.
JialinZou, Enhancement for HRPD to L TE Reselection and idle Traffic Redirection, C20-20090330-037r1, 3GPP2, Mar. 30, 2009, URL,ftp://ftp.3gpp2.org/TSGC/Working/2009/2009-03-New0rleans/TSG-C-2009-03-New%20rleans/WG2/C20-20090330-037r1-ALU_HRPDToL TE_ReSelection.pdf, Jun. 2008, pp. 1-13.
Notice of Allowance from Japanese Application No. 2012-514075, mailed Jul. 14, 2014, Japanese version, pp. 1-4.
Office Action from Chinese Application No. 201080028382.9, issued Jul. 31, 2014, English and Chinese versions, pp. 1-34.
Office Action from Chinese Application No. 201080028382.9, issued Mar. 20, 2015, English and Chinese versions, pp. 1-20.
Supplementary Search Report, European Application No. 10784000.1, mailed Jul. 29, 2015, 7 pages.
Ke-Chi Jang, "Inter-RAT neighbor information", 3GPP2 Draft, C22-20090330-024_046_NT_HRPDTOLTE_NEIGHBOR_INFO, 3rd Generation Partnership Project 2, 3GPP2, 2500 Wilson Boulevard, Suite 300, Arlington, Virginia 22201, USA, vol. TSGC, Mar. 31, 2009, 8 pages.
Office Action, Chinese Application No. 201080028382.9, mailed Sep. 18, 2015, 12 pages.

* cited by examiner

INCREASING TIME INTERVAL BETWEEN SUCCESSIVE SEARCHES FOR SIGNALING OF NEIGHBORING CELLS OF A DIFFERENT WIRELESS TECHNOLOGY

CROSS-REFERENCE TO RELATED APPLICATIONS

This application is a Submission Under 35 U.S.C. §371 for U.S. National Stage Patent Application of International Application Number: PCT/US2010/037048, filed Jun. 2, 2010 entitled "INCREASING TIME INTERVAL BETWEEN SUCCESSIVE SEARCHES FOR SIGNALING OF NEIGHBORING CELLS OF A DIFFERENT WIRELESS TECHNOLOGY," which claims priority to U.S. Provisional Application Ser. No: 61/183,757, filed Jun. 3, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services.

SUMMARY

In general, according to some embodiments, a mobile station attached to an access network receives a control message identifying neighboring cells of a different wireless technology than the access network. The mobile station searches for signaling of the neighboring cells of the different wireless technology, and in response to not being able to detect the signaling of the neighboring cells, the mobile station increases a time interval between successive searches for the signaling.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
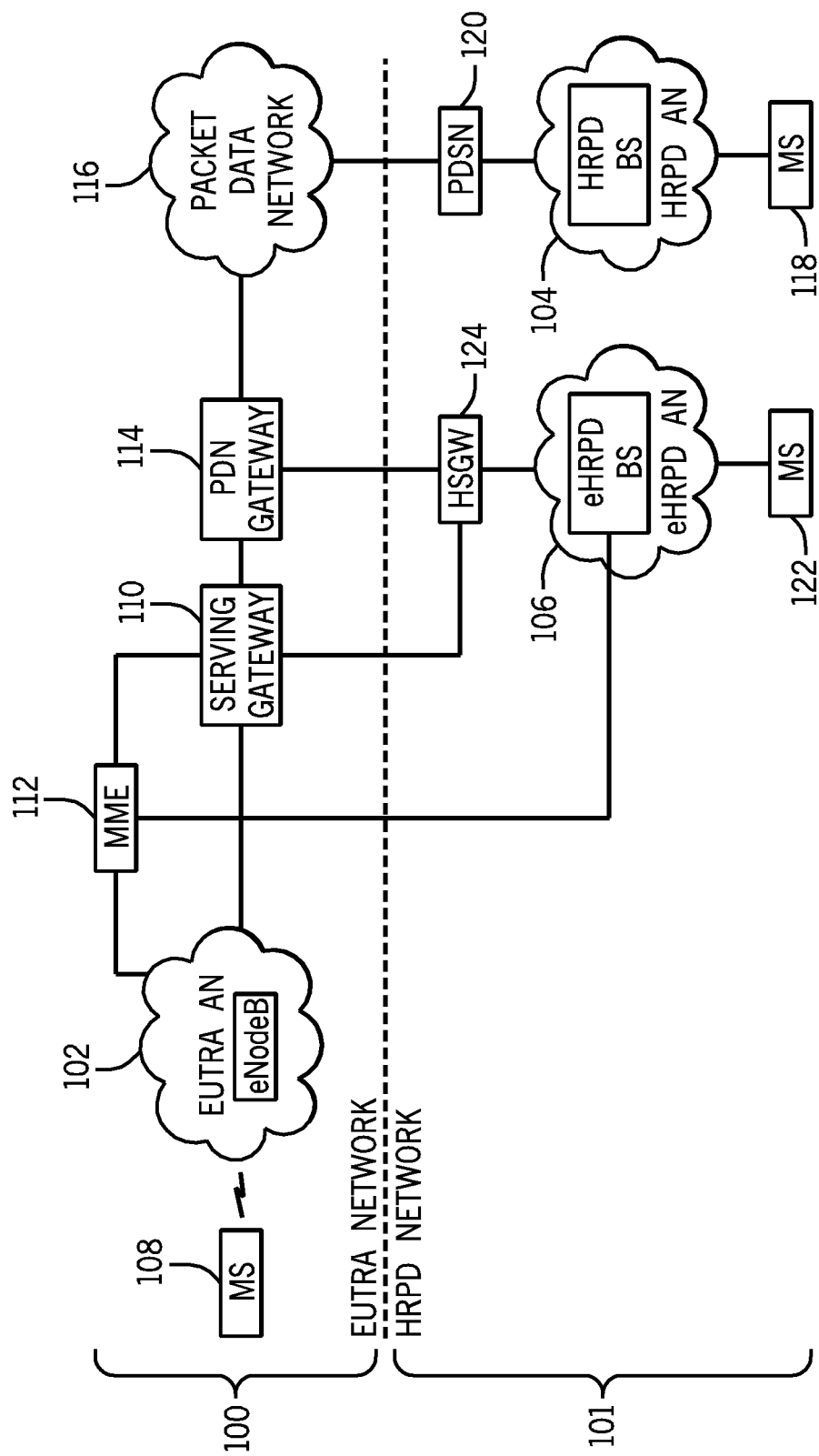
FIG. 1 is a block diagram of an example arrangement that includes different types of wireless access networks, in which some embodiments can be incorporated.

Wireless network operators are migrating to fourth generation (4G) wireless networks. One such type of 4G wireless network is the Long Term Evolution (LTE) wireless network, as defined by the Third Generation Partnership Project (3GPP). The LTE standard is also referred to as the EUTRA (Evolved Universal Terrestrial Radio Access) standard.

As part of the migration, wireless network operators may deploy access networks of different technologies such that mobile stations can seamlessly operate with either or both of the access networks of different technologies. For example, mobile stations can be handed off from an access network of a first technology to an access network of a second, different technology. Alternatively, mobile stations can perform cell selection when initially starting up from among the access networks of the different technologies. In some examples, a wireless network operator can operate both HRPD (High Rate Packet Data) access networks and EUTRA access networks. HRPD is defined by the CDMA (Code Division Multiple Access) 2000 standards, as established by 3GPP2.

In some implementations, the migration from HRPD to EUTRA involves use of evolved HRPD (eHRPD) technology. An eHRPD wireless access network is capable of interworking with an EUTRA wireless access network. A mobile station that supports the eHRPD technology can be handed off between the eHRPD access network and an EUTRA access network. Additionally, a mobile station that supports eHRPD can perform cell re-selection on either EUTRA or eHRPD access networks.

A network can thus include both HRPD cells and EUTRA cells, where an HRPD cell includes either an HRPD access network or an eHRPD access network, and where an EUTRA cell includes an EUTRA access network. Some of the HRPD cells may overlap with EUTRA cells. A "cell" can refer to an entire cell, a cell sector, or any other segment of a cell.

A mobile station that is in an HRPD cell may be notified of neighboring EUTRA cells. Once the mobile station is aware that EUTRA cells are present, the mobile station may attempt to acquire signaling of the neighboring EUTRA cells. For example, the mobile station may attempt to search for pilot signaling of the EUTRA cells, for the purpose of determining if the mobile station can perform hand-up to one of the EUTRA cells. Hand-up is a form of hand-off from a cell of a prior generation (e.g., third generation or 3G) to a cell of a higher generation (e.g., fourth generation or 4G). Pilot signaling includes signaling that is continuously transmitted by a base station of a particular cell to allow for mobile stations to detect the presence of such base station. Measurements made with respect to the pilot signaling allow a mobile station to determine whether or not the mobile station can establish a wireless connection with the base station.

It is possible that an HRPD cell that has notified a mobile station of presence of one or more EUTRA cells does not have complete EUTRA coverage or any EUTRA coverage. There can be a region in the HRPD cell (which can be a subset of the HRPD cell or the entirety of the HRPD cell) that does not have any EUTRA coverage. When the mobile station is in such region, the mobile station may attempt to search for pilot signaling of EUTRA neighboring cells even though the mobile station when in this region would not be able to find any EUTRA neighboring cells. Having to repeatedly perform searches for EUTRA pilot signaling when the mobile station is in the region of the HRPD cell without EUTRA coverage is wasteful of the battery power of the mobile station.

According to some embodiments, techniques or mechanisms are provided to conserve the power of the mobile station when the mobile station is in a region of an HRPD cell without any EUTRA coverage. This is accomplished by allowing the mobile station to increase time intervals between searches for pilot signaling of EUTRA neighboring cells, in response to the mobile station being unable to detect any pilot signaling of neighboring EUTRA cells, even though the mobile station has received a control message while in the HRPD cell regarding presence of neighboring EUTRA cells.

Although reference is made to HRPD and EUTRA technologies, it is noted that alternative embodiments can employ other wireless protocols. More generally, a mobile station, when attached to a first access network according to a first wireless technology, receives a control message indicating neighboring cells of a different wireless technology. The mobile station searches for signaling of such neighboring cells of the different wireless technology. In response to not being able to detect the signaling of the neighboring cells, the mobile station increases a time interval between successive searches for the signaling, to conserve battery power of the mobile station.

The ensuing discussion refers to HRPD and EUTRA technologies—it is noted that similar techniques as discussed below can be applied to other types of wireless protocols.

FIG. 1 illustrates an example arrangement that includes different types of access networks, including an EUTRA access network 102, an HRPD access network 104, and an eHRPD access network 106. The EUTRA access network 102 is part of an EUTRA cell, while the HRPD and eHRPD access networks 104 and 106 are part of respective HRPD cells.

Although just one EUTRA access network 102, one HRPD access network 104, and one eHRPD access network 106 is depicted in FIG. 1, it is noted that typically there would be multiple EUTRA access networks, multiple HRPD access networks, and multiple eHRPD access networks. As used here, the term "access network" or "wireless access network" refers to equipment used to allow a mobile station to wirelessly connect through the access network for accessing services provided on a target network, such as a packet data network 116.

According to the EUTRA technology, the EUTRA access network 102 includes an enhanced node B (eNode B), which is a type of base station. The HRPD access network 104 includes an HRPD base station, and the eHRPD access network 106 includes an eHRPD base station. A base station can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

As depicted in FIG. 1, in the EUTRA network 100, a mobile station 108 connects wirelessly to the EUTRA access network 102. The EUTRA access network 102 is in turn connected to various components, including a serving gateway 110 and a mobility management entity (MME) 112. The MME 112 is a control node for the EUTRA access network 102. For example, the MME 112 is responsible for idle mode mobile station tracking and paging procedures. The MME 112 is also responsible for choosing the serving gateway for a mobile station at initial attach and at time of handover. The MME 112 is also responsible for authenticating the user of the mobile station.

The serving gateway 110 routes bearer data packets. The serving gateway 110 also acts as a mobility anchor for the user plane during handovers between different access networks. The serving gateway 110 is also connected to a packet data network (PDN) gateway 114 that provides connectivity between the mobile station 108 and the packet data network 116 (e.g., the Internet, a network that provides various service, etc.).

In the HRPD network 101, a mobile station 118 connects wirelessly with the HRPD access network 104. The HRPD access network 104 is in turn connected to a packet data serving node (PDSN) 120, which in turn is connected to the packet data network 116.

Also, to allow for interworking between the HRPD network 101 and the EUTRA network 100, the eHRPD access network 106 is provided that wirelessly connects to a mobile station 122. The eHRPD access network 106 is in turn connected to an HRPD serving gateway (HSGW) 124. The HSGW 124 is the entity that terminates the eHRPD access network interface from the eHRPD access network 106. The HSGW 124 routes mobile station-originated or mobile station-terminated packet data traffic. The HSGW 124 provides interworking of the mobile station with the EUTRA network 100. The interworking functions include support for mobility, policy control and charging, access authentication, roaming, and others. The HSGW 124 supports seamless inter-technology mobility transfer between the EUTRA network 100 and the eHRPD access network 106.

Reference to the EUTRA, HRPD, and eHRPD standards is intended to refer to the current standards, as well as standards that evolve over time. It is expected that future standards evolve from EUTRA, HRPD, or eHRPD may be referred by different names. It is contemplated that reference to "EUTRA," "HRPD," or "eHRPD" is intended to cover such subsequently evolved standards as well. Also, as noted above, techniques or mechanisms according to some embodiments are applicable for systems employing other types of wireless protocols.

Figure 2:
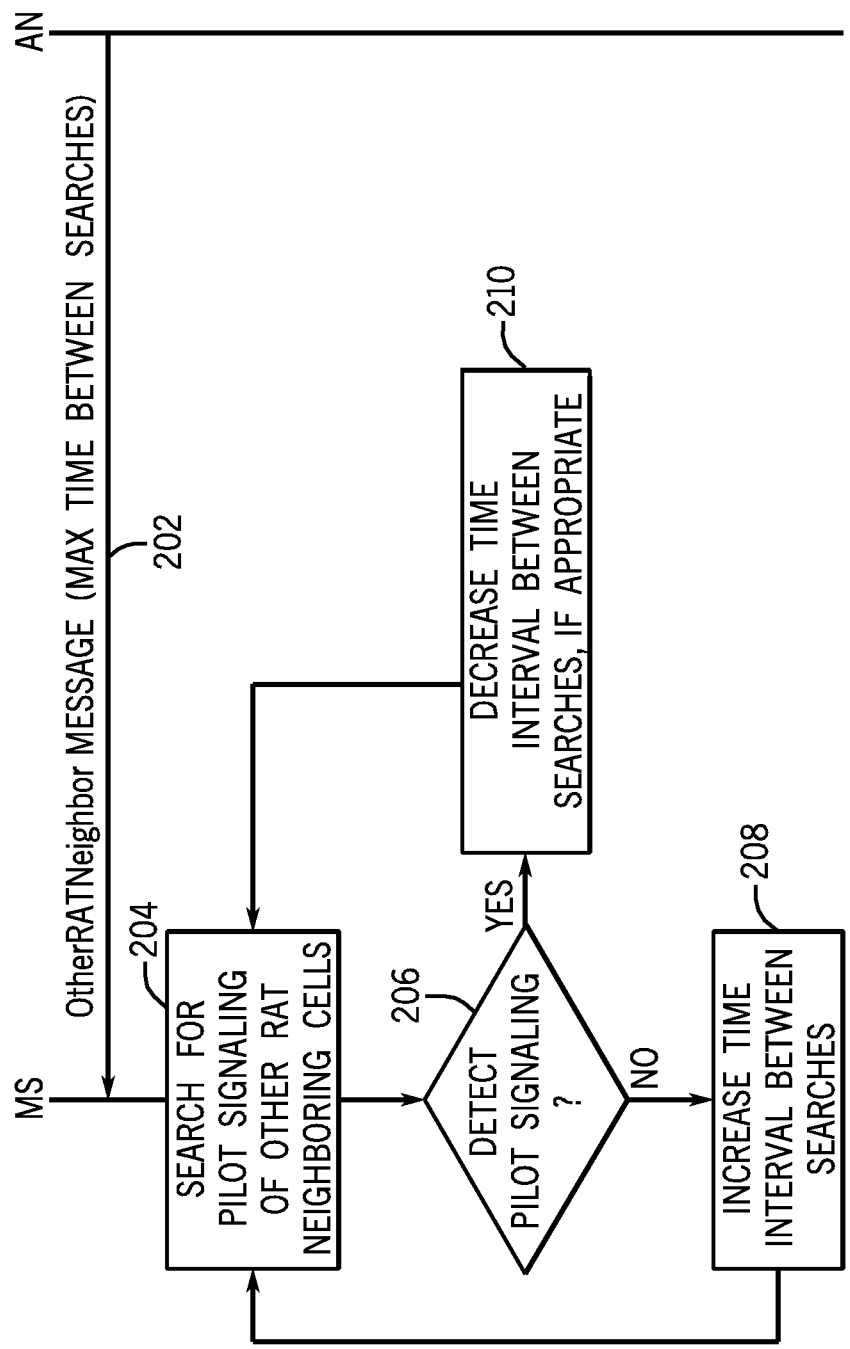
FIG. 2 is a message flow diagram of a process according to some embodiments.

FIG. 2 is a flow diagram of a process according to some embodiments. An HRPD access network (104 or 106) of an HRPD cell sends (at 202) an overhead message that is broadcast into the HRPD cell for receipt by the mobiles stations in the HRPD cell. In some examples, the overhead message is referred to as an OtherRATNeighbor message. The OtherRATNeighbor message identifies other RAT (radio access technology) neighboring cells that neighbor the HRPD cell, where the other RAT neighboring cells are EUTRA cells. The OtherRATNeighbor message can be sent periodically or intermittently. Every specified interval, the mobile station can wake up (if the mobile station is in a lower power mode) to receive the OtherRATNeighbor message.

In other implementations, other types of control messages can be used other than the OtherRATNeighbor message. Such other control messages can either be broadcast messages or unicast messages targeted to a particular mobile station.

The OtherRATNeighbor message can also contain an attribute that specifies the maximum time between successive searches for pilot signaling that is to be performed by the mobile station. In alternative implementations, the attribute specifying the maximum time between successive searches for the pilot signaling can be contained in a different control message sent from the access network to the mobile station.

In some implementations, the OtherRATNeighbor message (or another control message) can include an option field that can be set to a predefined value to indicate to mobile stations that the mobile stations are not to increase time intervals between searches in the event of an inability to detect pilot signaling of other RAT cells. The option field if set to a different value allows mobile stations to increase time intervals between searches in the event of an inability to detect pilot signaling of other RAT cells. The option field can be part of the attribute specifying the maximum time between searches, in some examples. Alternatively, the option filed can be part of another attribute.

In response to the OtherRATNeighbor message, the mobile station searches (at 204) for pilot signaling of other RAT neighboring cells identified by the OtherRATNeighbor message. Next, the mobile station determines (at 206) whether any pilot signaling of the identified RAT neighboring cells has been detected. If not, the time interval between successive searches for pilot signaling of the other RAT neighboring cells is increased (at 208), and the process returns to 204 to repeat the searching for pilot signaling of other RAT neighboring cells using the increased time interval. The amount of time interval increase can be specified by an attribute of the OtherRATNeighbor message that indicates an increase time unit. Note that the increase of the time interval between successive searches for pilot signaling, as performed at 208, cannot exceed the maximum time between searches specified in an attribute of the OtherRAT-Neighbor message (or other control message).

If it is determined at 206 that pilot signaling of the other RAT neighboring cells has been detected, the mobile station can decrease (at 210) the time interval between successive searches for pilot signaling, if appropriate. For example, the time interval between successive searches for pilot signaling can be decreased if such time interval was previously increased. Next, control proceeds back to task 204 to search for pilot signaling of other RAT neighboring cells using the updated time interval between searches.

As noted above, it is also possible for an access network to specify that mobile stations are not to increase time intervals between searches for pilot signaling of other RAT neighboring cells even if the mobile stations are unable to find the pilot signaling of such other RAT neighboring cells. For example, the OtherRATNeighbor message can include an option field that can be set to a predefined value to indicate to mobile stations that the mobile stations are not to increase time intervals between searches in the event of an inability to detect pilot signaling of other RAT pilot signaling. The ability to selectively control whether or not mobile stations are to increase search intervals allows for more flexible control by an access network.

Figure 3:
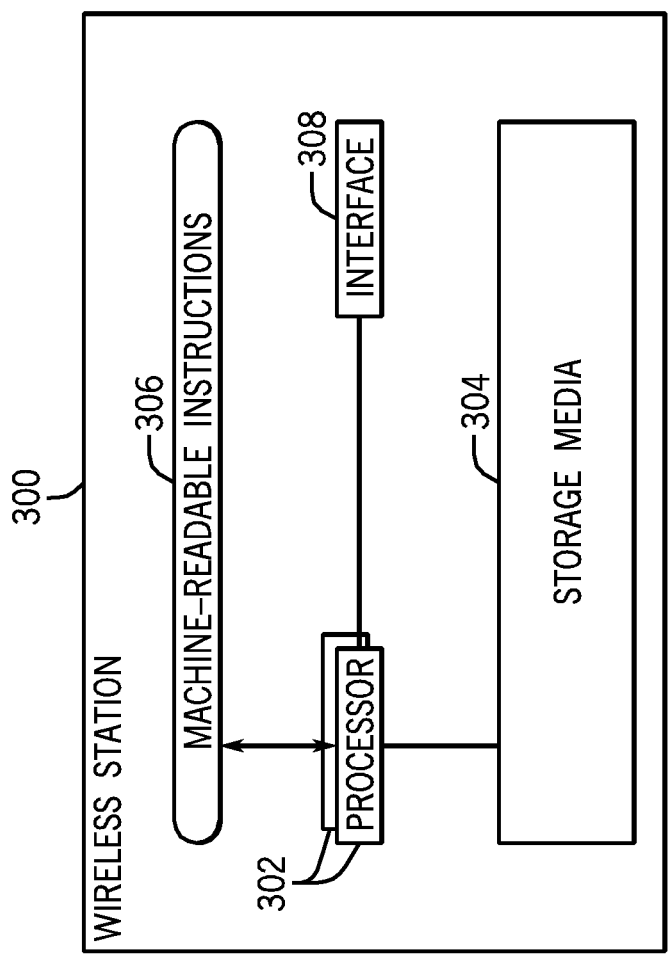
FIG. 3 is a block diagram of a wireless station according to some embodiments.

FIG. 3 is a block diagram of a wireless station 300, which can either be a mobile station (e.g., mobile station 108, 118, or 122 in FIG. 1) or a base station (e.g., eNodeB, HRPD base station, or eHRPD base station in FIG. 1). The wireless station 300 includes a processor (or multiple processors) 302, which is (are) connected to storage media 304. Machine readable instructions 306 are executable on the processor(s) 302 to perform respective tasks associated with the wireless station 300, such as tasks depicted in FIG. 2 or 3. The wireless station 300 also includes an interface 308 for communicating over a wireless link, such as a radio frequency (RF) link.

The machine-readable instructions 306 are loaded for execution on the processor(s) 302. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:
1. A method comprising:
a mobile station performing,
receiving from a first access network to which the mobile station is attached, a control message identifying neighboring cells of a different wireless technology than the first access network, wherein the control message comprises a field indicating a maximum time interval between successive searches for signaling of the identified neighboring cells;
searching for the signaling of the identified neighboring cells of the different wireless technology; and
in response to not being able to detect the signaling of the identified neighboring cells, increasing a time interval between successive searches for the signaling of the identified neighboring cells to a value less than the maximum time interval indicated in the field comprised in the control message received from the first access network.
2. The method of claim 1, wherein searching for the signaling of the identified neighboring cells comprises searching for pilot signaling of the identified neighboring cells.

3. The method of claim 1, further comprising:
the mobile station performing,
receiving an attribute from the first access network, wherein the attribute has a field selectively settable to a first value to indicate that the mobile station is allowed to increase the time interval between successive searches for the signaling, and to a second value to indicate that the mobile station is not to increase the time interval between successive searches for the signaling.

4. The method of claim 3, wherein receiving the attribute comprises receiving the attribute in the control message.

5. The method of claim 1, wherein receiving the control message comprises receiving an overhead message broadcast by the first access network.

6. The method of claim 1, wherein the neighboring cells use an Evolved Universal Terrestrial Radio Access (EUTRA) technology.

7. The method of claim 6, wherein the first access network is according to a High Packet Data Rate (HRPD) technology.

8. A mobile station comprising:
an interface to communicate wirelessly with an access network that operates according to a first technology; and
at least one processor configured to:
receive, from the access network, a control message indicating existence of neighboring cells according to a second technology different from the first technology, wherein the control message comprises a field indicating a maximum time interval between successive searches for signaling of the neighboring cells;
search for the signaling of the neighboring cells; and
in response to an inability to find the signaling of the neighboring cells, increase a time interval between successive searches for the signaling of the neighboring cells to a value less than the maximum time interval indicated in the field comprised in the control message received from the first access network.

9. The mobile station of claim 8, configured to operate according to both the first and second technologies.

10. The mobile station of claim 8, wherein the signaling of the neighboring cells to be searched by the mobile station comprises pilot signaling.

11. The mobile station of claim 8, wherein the neighboring cells use an Evolved Universal Terrestrial Radio Access (EUTRA) technology.

12. The mobile station of claim 8, wherein the access network is according to a High Packet Data Rate (HRPD) technology.

13. The mobile station of claim 8,
wherein the at least one processor is further configured to:
receive an attribute from the access network, wherein the attribute has a field selectively settable to a first value to indicate that the mobile station is allowed to increase the time interval between successive searches for the signaling, and to a second value to indicate that the mobile station is not to increase the time interval between successive searches for the signaling.

14. The mobile station of claim 13,
wherein to receive the attribute, the at least one processor is further configured to receive the attribute in the control message.

15. The mobile station of claim 8,
wherein to receive the control message, the at least one processor is further configured to receive an overhead message broadcast by the access network.

16. An article comprising at least one non-transitory computer-readable storage medium storing instructions that upon execution by a mobile station cause the mobile station to:
receive from an access network to which the mobile station is attached, a control message identifying neighboring cells of a different wireless technology than the access network, wherein the control message comprises a field indicating a maximum time interval between successive searches for signaling of the identified neighboring cells;
search for the signaling of the identified neighboring cells of the different wireless technology; and
in response to not being able to detect the signaling of the identified neighboring cells, increase a time interval between successive searches for the signaling of the identified neighboring cells to a value less than the maximum time interval indicated in the field comprised in the control message received from the first access network.

17. The article of claim 16, wherein the signaling includes pilot signaling.

18. The article of claim 16, wherein the neighboring cells use an Evolved Universal Terrestrial Radio Access (EUTRA) technology.

19. The article of claim 16, wherein the access network is according to a High Packet Data Rate (HRPD) technology.

20. A base station comprising:
an interface to communicate wirelessly with at least one mobile station; and
at least one processor to:
send, to at least one mobile station attached to the base station, a control message identifying neighboring cells of a wireless technology different from a wireless technology used by the base station, wherein the control message comprises a field indicating a maximum time interval between successive searches by the at least one mobile station for signaling of the identified neighboring cells, wherein the control message is to cause the at least one mobile station to search for signaling of the identified neighboring cells, and to cause the mobile station to increase a time interval between successive searches for the signaling of the identified neighboring cells to a value less than the maximum time interval indicated in the field comprised in the control message in response to not being able to detect the signaling of the identified neighboring cells.

21. The base station of claim 20, wherein the neighboring cells use an Evolved Universal Terrestrial Radio Access (EUTRA) technology, and wherein the base station is according to a High Packet Data Rate (HRPD) technology.

* * * * *